(12) United States Patent
Satony et al.

(10) Patent No.: US 12,324,513 B2
(45) Date of Patent: Jun. 10, 2025

(54) DRIVE ADAPTER FOR TOOL-FREE MOUNTING OF A DRIVE ELEMENT ON A RAIL ELEMENT OF A GUIDE SYSTEM

(71) Applicant: Accuride International GmbH, Diez (DE)

(72) Inventors: Christian Satony, Urbar (DE); Christoph Neuhaus, Niederelbert (DE)

(73) Assignee: Accuride International GmbH, Diez (DE)

( * ) Notice: Subject to any disclaimer, the term of this patent is extended or adjusted under 35 U.S.C. 154(b) by 505 days.

(21) Appl. No.: 17/827,372

(22) Filed: May 27, 2022

(65) Prior Publication Data

US 2022/0381396 A1    Dec. 1, 2022

(51) Int. Cl.
*A47B 88/457* (2017.01)
*H02K 7/00* (2006.01)

(52) U.S. Cl.
CPC ........... *A47B 88/457* (2017.01); *H02K 7/003* (2013.01)

(58) Field of Classification Search
CPC .................................................. A47B 88/457
See application file for complete search history.

(56) References Cited

U.S. PATENT DOCUMENTS

| 2022/0265046 | A1* | 8/2022 | Zou | F25D 25/025 |
| 2023/0337820 | A1* | 10/2023 | Neuhaus | A47B 88/447 |
| 2024/0081013 | A1* | 3/2024 | Satony | H05K 7/02 |
| 2024/0164520 | A1* | 5/2024 | Satony | F16D 63/008 |

FOREIGN PATENT DOCUMENTS

| CN | 108338560 A | * | 7/2018 | ........... A47B 88/457 |
| CN | 106225411 B | | 8/2019 | |
| CN | 110664140 A | * | 1/2020 | ........... A47B 88/457 |
| WO | WO-2009/119921 A1 | | 10/2009 | |

OTHER PUBLICATIONS

European search report issued in European patent application No. 21177008.6, dated Nov. 18, 2021.

\* cited by examiner

*Primary Examiner* — Daniel J Rohrhoff
(74) *Attorney, Agent, or Firm* — MEDLER FERRO WOODHOUSE & MILLS PLLC

(57) ABSTRACT

A drive adapter for tool-free mounting of a drive element on a rail element of a guide system includes a drive carrier and a holding section. The drive carrier includes a mounting means for a drive element. The holding section includes two support surfaces and a holding ridge which connects the support surfaces at least in sections and defines a distance between the support surfaces. The two support surfaces are either each convexly curved, face away from one another and configured such that they can be clamped between two rolling element running surfaces of the rail element which face one another, or each concavely curved, face toward one another and configured such that they can be clamped onto two legs of the rail element and carry rolling element running surfaces which face away from one another.

18 Claims, 6 Drawing Sheets

DRIVE ADAPTER FOR TOOL-FREE MOUNTING OF A DRIVE ELEMENT ON A RAIL ELEMENT OF A GUIDE SYSTEM

CROSS REFERENCE TO RELATED APPLICATION

This application claims benefit of European patent application no. 21177008.6, filed on Jun. 1, 2021, which is incorporated by reference in its entirety.

TECHNICAL FIELD

The present invention relates to a drive adapter for tool-free mounting of a drive element on a rail element of a guide system.

The present invention further relates to a system consisting of a guide system comprising at least two rail elements, a drive element and such a drive adapter.

BACKGROUND

Guide systems, in particular linear guide systems, such as telescopic rails, comprising at least two rail elements and perhaps a rolling element cage with rolling elements received therein for reducing the friction between the rail elements are known from the prior art in a wide variety of different embodiments. They are used in different household appliances, but also in automotive construction and in many other applications. A large number of applications already use motor-driven guide systems.

The applications for guide systems are often price-sensitive. Guide systems with a motor drive are complex in design, however, and require extensive assembly when the systems are put together.

SUMMARY

In light of this, the underlying object of the present invention is to make it possible to integrate a drive element into a system consisting of the drive element and a guide system with as few work steps as possible.

This object is achieved with a drive adapter for tool-free mounting of a drive element on a rail element of a guide system according to the independent claim 1 of the present application.

For this purpose, the drive adapter for tool-free mounting of a drive element on a rail element of a guide system comprises a drive carrier and a holding section, wherein the drive carrier comprises a mounting means for the drive element, wherein the holding section comprises two support surfaces and a holding ridge which connects the support surfaces at least in sections and defines a distance between the support surfaces, wherein the two support surfaces are either each convexly curved, face away from one another and configured such that they can be clamped between two rolling element running surfaces of the rail element which face one another, or each concavely curved, face toward one another and configured such that they can be clamped onto two legs of the rail element and carry rolling element running surfaces which face away from one another.

The drive adapter according to the invention comprises two essential elements, namely a drive carrier and a holding section. The drive carrier is configured to include a mounting means for the drive element. The holding section, on the other hand, serves to connect the drive adapter to a rail element of a guide system without tools or to mount the drive adapter on this rail element.

The drive adapter according to the invention makes use of the design principle of the rail elements of a guide system. In one embodiment, such a rail element comprises a, preferably flat, rail back, from which two legs extend from said rail back substantially parallel to one another and in the same direction. These legs of the rail elements each carry a rolling element running surface for one or a plurality of rolling elements which, in the assembled state of a guide system, are positioned between two rail elements and reduce friction of the rail elements during the pull-out movement. As a result of this design of the rail elements, the rolling element running surfaces of two rail elements which can slide relative to one another face one another, so that a single rolling element between the two rail elements is in engagement with both the rolling element running surface of the one rail element and the rolling element running surface of the other rail element.

The holding section of the drive adapter is fitted to complement the rail element. The holding section comprises two support surfaces analogous to the legs of the rail element. The support surfaces, in turn, are held at a defined distance from one another by a holding ridge. The holding ridge connects the two support surfaces to one another at least in sections. In one embodiment, the support surfaces come into contact with the legs of the rail element when being mounted on the rail element.

As described above, in each case there is a rail element comprising two rolling element running surfaces which face one another on the legs of this rail element and a rail element comprising rolling element running surfaces which face away from one another on the legs of this second rail element. The rail element comprising the running surfaces which face away from one another is referred to as the inner rail and the rail element with running surfaces which face one another is referred to as the outer rail. The drive adapter according to the invention can alternatively be pushed onto or into the outer rail.

The form fit between the support surfaces of the holding section of the drive adapter and the legs of the rail element carrying the rolling element running surfaces causes the drive adapter to be fixed in the vertical direction of the rail element, i.e., substantially in a direction parallel to the rail back and perpendicular to the pull-out direction. It has been found that the frictional forces which act simultaneously between the legs of the rail element and the support surfaces of the holding section of the drive adapter are not sufficient in certain drive situations to also adequately secure the drive adapter to the rail element in or against the pull-out direction. Therefore, in one embodiment of the invention, the holding section comprises at least one latching lug or latching recess for latching with a complementary element on the rail element.

It has been shown that such a latching lug or latching recess is preferably provided on the holding ridge of the holding section, so that the latching lug or the latching recess comes into engagement with a complementary element disposed on the rail back of the rail element.

In one embodiment of the invention, the drive adapter is made in one or more pieces of plastic. Such plastic components can be manufactured in large numbers with the required dimensional precision by injection moulding.

It makes sense to use the holding ridge as a carrier for other elements of the drive. Therefore, in one embodiment of the invention, the holding ridge carries at least one bearing block. This bearing block is used in the system to receive a bearing of a shaft, for example a grooved rolling element bearing, or the bearing block itself forms part of a sliding bearing of a shaft.

One possible form of a drive for a telescopic rail includes a spindle drive comprising a shaft that extends in pull-out direction in the form of a spindle. In this case, the shaft, too, has to be guided on the rail element to which the drive element is connected.

It has been found that a slip coupling between a drive shaft and an output shaft of the drive for a guide system effectively prevents damage to the elements involved in the event of an overload situation. In one embodiment, the slip coupling is a magnetic coupling. A slip coupling in the form of a magnetic coupling also enables easier mounting of the individual elements on the rail element.

Therefore, in one embodiment of the invention, the holding ridge comprises two bearing blocks for supporting a drive shaft on one side and for supporting an output shaft, preferably in the form of a threaded spindle, on the other side.

In one embodiment, the bearing blocks are configured such that they each receive a bearing, for example a grooved rolling bearing, of the drive shaft, and of the output shaft. In another embodiment, the bearing blocks themselves form part of a rolling bearing for supporting the drive shaft or the output shaft.

In one embodiment, an opening for receiving the coupling between a drive shaft and an output shaft is provided in the holding ridge between the two bearing blocks.

In one embodiment of the invention, the mounting means of the drive carrier comprises two clamping jaws with concave clamping surfaces which face one another for clamping a convex outer surface of the drive element, in particular a drive element having an electric motor in a force-locking manner. With the aid of the two clamping jaws, the drive element can be fastened to the drive carrier of the drive adapter, preferably without tools.

In a further embodiment of the invention, the mounting means of the drive carrier comprises a mounting frame having two opposite clamping surfaces for receiving the drive element between the two clamping surfaces in a force-locking manner. In such a mounting frame, too, the drive element, preferably a drive element having an electric motor, can be mounted between the two clamping surfaces without tools.

In addition to an electric motor without additional functional elements, a drive element having an electric motor in the sense of the present application also includes drive assemblies that comprise at least one other functional element in addition to the electric motor, for example a gearing, a brake, or an encoder.

In one embodiment of the invention, a distance between the two opposite clamping surfaces is adjustably variable, so that drive elements of different lengths, preferably drive elements in the form of electric motors or drive elements having an electric motor, can be received in the mounting frame. A single type of drive adapter can thus be used for a wide variety of designs of drive elements, preferably of electric motors. Such an embodiment of the mounting frame serves in particular to receive drive elements having different lengths, preferably having different lengths in pull-out direction. This also increases the number of common parts for rail elements of different designs and dimensions.

In a further embodiment of the invention at least one of the two clamping surfaces is resiliently pretensioned at least in sections in the direction of the other clamping surface.

In a further embodiment of the invention, at least one of the two clamping surfaces comprises at least one crimping bead for clamping the drive element in a force-locking manner.

In a further embodiment, the two clamping surfaces of the mounting frame extend substantially perpendicular or substantially parallel to the holding ridge. This provides an embodiment of the drive adapter that enables mounting of an electric motor having a motor shaft which extends parallel to the holding ridge (clamping surfaces at least in sections perpendicular to the holding ridge). Alternatively, this provides an embodiment of the drive adapter that enables mounting of an electric motor having a motor shaft which extends perpendicular to the holding ridge (clamping surfaces substantially parallel to the holding ridge). An electric motor mounted in such a manner is in particular suitable for driving one of the following elements, namely a belt drive comprising a drive belt which extends in pull-out direction, a rack drive, a chain drive, or a drive with a flexible shaft.

In one embodiment of the invention, the mounting means of the drive carrier comprises a rolling bearing seat for receiving a rolling bearing as part of a drive element comprising a shaft. The rolling bearing seat is preferably disposed such that it can receive a rolling bearing for a shaft which is substantially perpendicular to the holding ridge.

In one embodiment of the invention, the drive carrier or the holding section comprises an end stop carrier for receiving, preferably in a tool-free manner, a sensor for detecting a stop position of a rail element of the guide system.

The aforementioned object is also solved by a system according to the independent claim directed thereto in the present application. According to the invention, such a system comprises a guide system having at least a first and a second rail element, a drive element and a drive adapter, as previously described in the embodiments, wherein the first rail element comprises two legs which each carry a concavely curved rolling element running surface and a rail back which connects said legs, wherein the holding section is either clamped into the first rail element such that the convexly curved support surfaces which face away from one another are each in engagement with a rolling element running surface, or the holding section is clamped onto the first rail element such that the concavely curved support surfaces which face one another are in engagement with outer surfaces of the legs which face one another.

In one embodiment of the invention, the guide system is a linear guide system, in which the relative movement between the first and the second rail elements takes place along a straight line. In one embodiment of the invention, the guide system is selected from a group consisting of a pull-out guide, a telescopic rail and a linear guide. The generic term "guide system" includes sliding guides, ball guides and roller guides. When, in the sense of the present application, reference is made to a guide system, this term should be generally understood to include not only rails in which the first rail element and the second rail element have approximately the same length, i.e., in particular telescopic rails, but also guides, in particular linear guides, in which the second rail element is significantly shorter than the first rail element or in which the second rail element is formed by a roller carriage.

In one embodiment, the guide system is a telescopic rail. Such a telescopic rail is characterised in that the first and the second rail elements are displaceably mounted on one another in such a way that the second rail element can be pulled out of the first rail element at least in sections.

When the present application states that the guide system according to the invention comprises a first rail element and a second rail element, this does not preclude the guide system, in particular if it is a telescopic rail, comprising further rail elements, in particular three rail elements, for example to provide complete pull-out.

In the sense of the present application, the pull-out direction is understood to be the direction in which the first rail element and the second rail element can be moved relative to one another, preferably linearly, in order to move from a retracted position to a pulled-out position. Accordingly, a direction opposite to the pull-out direction is the direction in which the first and second rail elements are moved relative to one another in order to return to the retracted position.

For a telescopic rail, the retracted position is the position of the first and the second rail elements relative to one another in which the telescopic rail is fully retracted. The pulled-out position then refers to the position of the first and the second rail element relative to one another in which the telescopic rail is pulled all the way out.

In one embodiment of the invention, rolling elements received in a rolling element cage are disposed on the two rolling element running surfaces of the first rail element and on the two rolling element running surfaces of the second rail element. These rolling elements roll on the respective running surfaces and reduce friction between the first rail element and the second rail element. A rolling element in the sense of the present application is understood to be a rotating element which, as an element of a guide, significantly reduces the friction between the various rail elements and thus facilitates a relative movement of two rail elements with respect to one another. Rolling elements are, for example, balls, rollers, barrels, needles or cones.

In one embodiment of the present invention, the rolling elements are balls. It goes without saying that the rolling element cage in this case is a ball cage.

In one embodiment of the invention, at least the first rail element or the second rail element is made of a material selected from a group consisting of sheet steel, aluminized sheet steel and stainless steel.

In one embodiment of the invention, either a distance between the support surfaces of the holding section which face away from one another prior to being placed into the first rail element is larger than a distance between the rolling element running surfaces of the first rail element or a distance between the support surfaces of the holding section which face one another prior to being placed onto the first rail element is smaller than a distance of the outer surfaces of the legs which face away from one another. In the one case, the support surfaces of the holding section are oversized compared to the distance between the rolling element running surfaces of the first rail element. In the second case, the outer surfaces of the legs of the first rail element which face away from one another have interference relative to the support surfaces of the holding section which face one another.

In one embodiment of the invention, the holding ridge of the drive adapter comprises a latching lug that is snapped into a latching recess in the rail back of the first rail element, or the rail back of the first rail element comprises a latching lug that is snapped into a latching recess in the holding ridge of the drive adapter.

In a further embodiment of the invention, the drive element is received in the drive carrier of the drive adapter without tools and in a form- or force-locking manner.

In embodiment of the invention, the drive element is selected from a group consisting of an electric motor and a rolling bearing having a drive shaft received in the rolling bearing.

An electric motor in the sense of the present invention is a motor comprising a rotating motor shaft for providing a torque. In one embodiment of the invention, the electric motor is selected from a group consisting of a stepper motor, a brushless DC motor, or a brushed DC motor.

In one embodiment of the invention, the system comprises a coupling, wherein the coupling connects a drive shaft, in particular the motor shaft of an electric motor, and an output shaft, for example a threaded spindle of a spindle drive, in such a way that the coupling transmits a torque from the drive shaft to the output shaft.

In one embodiment of the invention, the coupling is a magnetic coupling comprising a first coupling element and a second coupling element, wherein the first coupling element is connected to the drive shaft in a torque-proof manner and wherein the second coupling element is connected to the output shaft in a torque-proof manner.

One such embodiment is based on the idea of using a magnetic coupling to transmit torque from the drive shaft coupled to the electric motor, in particular to a motor shaft of the electric motor, to the output shaft of the drive. Such a magnetic coupling has the advantage that the coupling itself provides overload protection. A magnetic force between the first and the second coupling element causes a limitation of the torque transmission. If the driven rail element is blocked, for example, the magnetic coupling slips. The coupling element connected to the drive shaft continues to rotate, but no longer transmits torque to the coupling element connected to the output shaft. The magnetic coupling forms a slip coupling that slips when a certain counter-torque of the output shaft is exceeded relative to the torque of the drive shaft applied by the electric motor. This provides overload protection for the driven guide system and, if necessary, pinch protection.

The magnetic coupling also enables quick mounting during manufacturing. The output shaft of the drive can be preassembled with the corresponding second coupling element, and the drive shaft or, if applicable, the motor along with the drive shaft, can likewise be preassembled with the first coupling element. In one embodiment, the motor is flange-mounted during assembly, and the two shafts are directly connected to one another when appropriately positioned so that torque can be transmitted between them.

In one embodiment, the bearing blocks of the drive adapter and/or the respective bearings received in them are configured such that they absorb axial forces acting on the output shaft or the drive shaft. In one embodiment, axial forces are absorbed due to the fact that the bearing block, as a part-circular bearing bushing of a rolling bearing, forms an axial stop for a stop element connected to the respective drive and/or output shaft. In one embodiment of the invention this stop element is the first or the second coupling element. In a further embodiment, the bearing blocks absorb axial forces by axially fixing a respective rolling element bearing.

A configuration in which the bearing blocks absorb axial forces has a number of advantages. On the one hand, the bearing blocks configured in this way prevent the axially acting forces from being introduced into an electric motor coupled to the drive shaft and damaging it.

On the other hand, the bearing blocks configured in this way make it possible to define the torque transmitted by a magnetic coupling. Due to the acting forces, the first and second coupling elements of the magnetic coupling are pressed against one another when the guide system is extended in pull-out direction. The frictional force between the coupling elements, and with it the maximum torque transmitted between the coupling elements, increases. On the other hand, when the guide system is retracted against the pull-out direction, the first and second coupling elements of the magnetic coupling are pulled apart. The frictional force between the coupling elements, and with it the maximum torque transmitted between the coupling elements, decreases. If the forces acting axially, in particular on the output shaft, are absorbed by the respective bearing block, however, the coupling elements cannot be pressed against one another or pulled apart beyond a certain clearance specified by the bearings.

BRIEF DESCRIPTION OF THE FIGURES

Further advantages, features, and possible applications of the present invention will become apparent from the following description of embodiments and the associated figures. In the figures, the same elements are identified with the same reference signs.

DETAILED DESCRIPTION OF PARTICULAR EMBODIMENTS

The system 1 described in the following with reference to the figures includes a linear guide system in the form of a telescopic rail 2, a drive adapter 3 and a drive element, which in the shown embodiments is either an electric motor 4 or a drive shaft comprising a rolling bearing.

Figure 1:
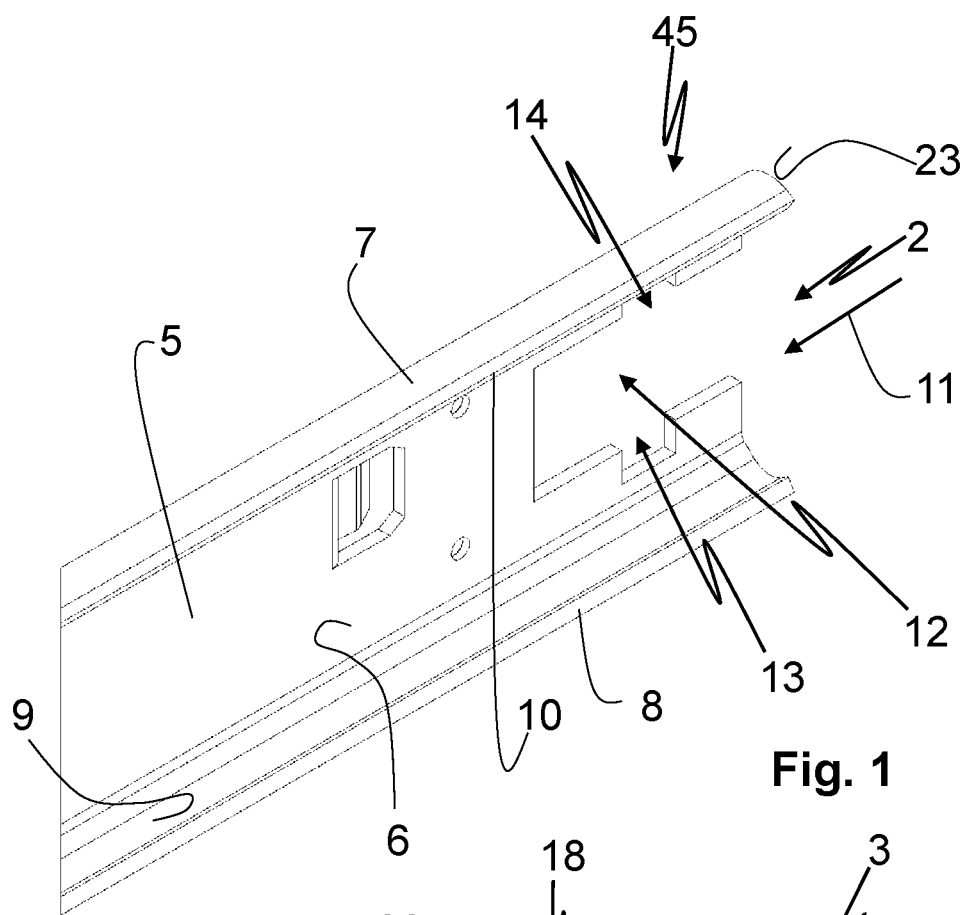
FIG. 1 is a partially broken-away isometric view of a first rail element of a telescopic rail from a system comprising a telescopic rail, a drive adapter, and a drive element.
Figure 2:
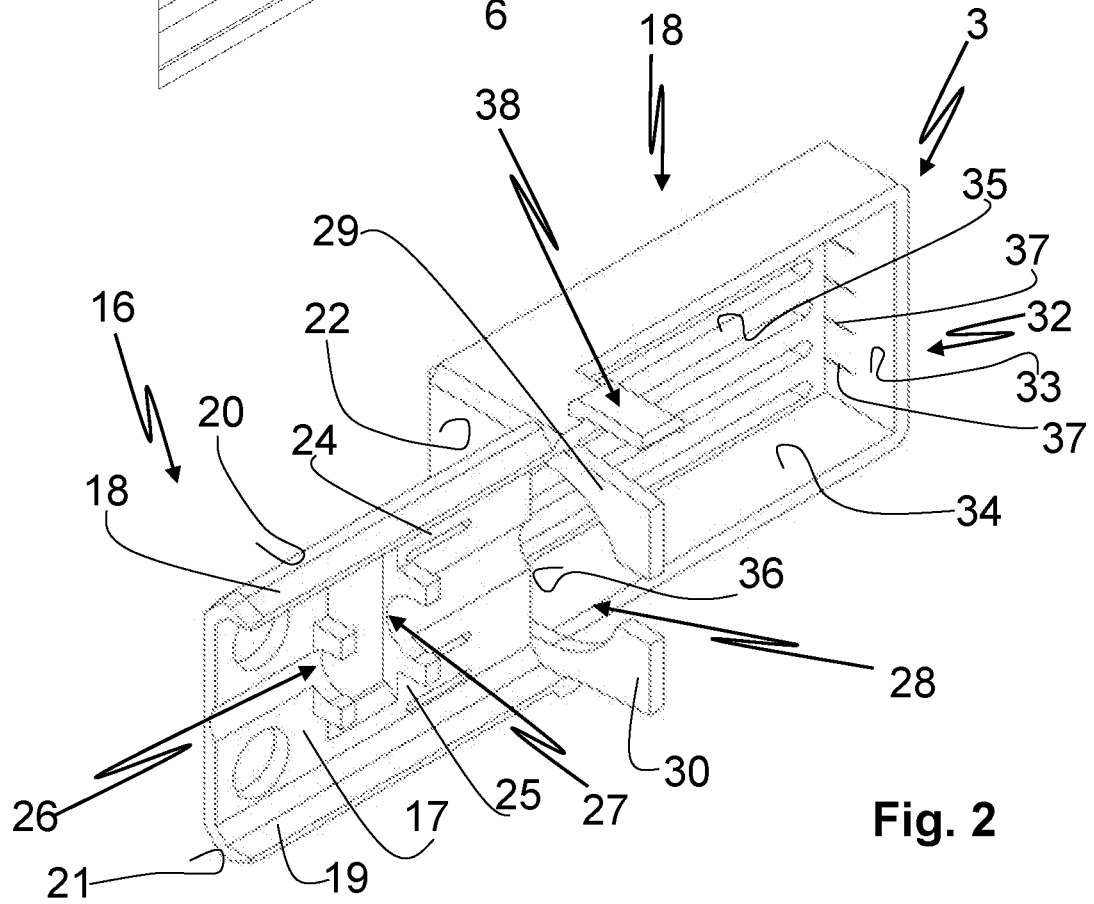
FIG. 2 is an isometric illustration of a first embodiment of a drive adapter from above at an angle.

FIG. 1 shows a first rail element 5 of a telescopic rail, which is adapted for motorization. The first rail element 5 comprises a rail back 6 which is substantially flat. Extending from this rail back 6 are an upper leg 7 and a lower leg 8, which carry the rolling element running surfaces 9, 10 of the telescopic rail 2. The rolling element running surfaces 9, 10 are formed by a surface which is concave in a cross-sectional view perpendicular to the pull-out direction 11 and on which balls run as rolling elements when a second rail element is mounted on the first rail element 5.

The first end 45 of the first rail element 5 is provided to receive a drive adapter 3 in the sense of the present application. For this purpose, the first end 45 of the rail element 5 comprises an opening 12 through which the coupling plates of a magnetic coupling in one embodiment can extend between a drive shaft and an output shaft. Two latching recesses 13, 14, in which two latching lugs 15 of the drive adapter 3 engage in the assembled state, are implemented in the rail back 6 as well.

In embodiments of the drive adapter as described below, a drive adapter can be flange-mounted to the first rail element 5 adapted in this way without tools. A drive element received on the drive adapter is thus mounted on the rail element 5 without tools.

Each embodiment of a drive adapter 3 shown in the figures comprises a holding section 16 and a drive carrier 18 for receiving the drive element 4.

The holding section 16 is crucial for the tool-free fastening of the drive adapter 3 to the first rail element 5. The holding section 16 comprises a holding ridge 17, which is substantially flat and, in the assembled state of the drive adapter, extends substantially parallel to the rail back 6 of the first rail element 5. Two legs 18, 19 which carry the support surfaces 20, 21 extend from this holding ridge 17. The holding section 16 with the holding ridge 17 and the legs 18, 19 with the support surfaces 20, 21 is substantially complementary to the first rail element 5 with the rail back 6 and the legs 7, 8. The holding section 16 can therefore be inserted between the rolling element running surfaces 9, 10 of the first rail element 5, so that the support surfaces 20, 21 of the holding section 16 are in contact with the rolling element running surfaces 9, 10.

The thus provided form fit secures the drive adapter 3 against movement in the vertical direction of the first rail element 5 perpendicular to the pull-out direction 11. Compared to the distance between the rolling element running surfaces 9, 10 of the first rail element 5, the distance between the support surfaces 20, 21 of the holding section 16 which face away from one another has interference of approximately 1 mm. A force fit is thus provided between the holding section 16 and the first rail element 5, the frictional forces of which substantially limit displacement of the drive adapter 3 in and against the pull-out direction relative to the first rail element 5.

However, in order to completely fix the drive adapter 3 in and against the pull-out direction 11 on the first rail element 5 as well, an outer surface 22 of the drive carrier 18, which extends substantially perpendicular to the pull-out direction, 11 forms a stop. When the drive adapter 3 is mounted on the first rail element 5, this stop comes into contact with a front face 23 on the first end 10 45 of the first rail element 5. The contact between the front face 23 of the first rail element 5 and the outer surface 22 of the drive carrier 18 prevents the drive adapter 3 from being pushed further into the rail element 5 in pull-out direction 11.

Figure 3:
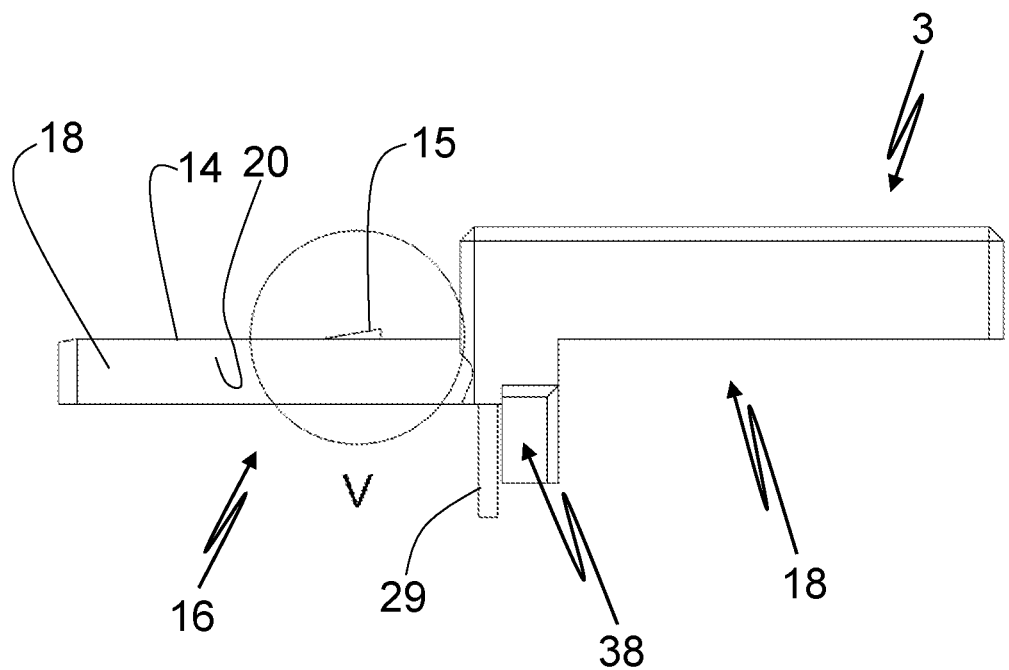
FIG. 3 is a plan view onto the drive adapter of FIG. 2 from above.
Figure 4:
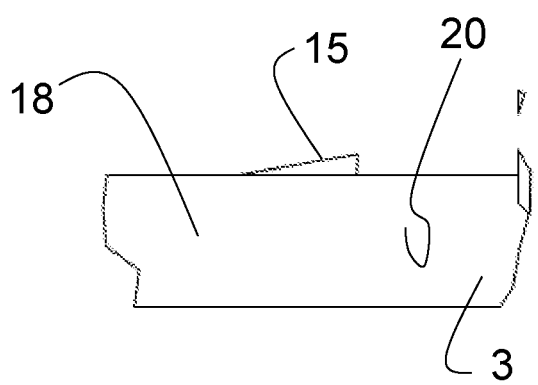
FIG. 4 is a broken-away enlarged illustration of the section labelled V in FIG. 3.
Figure 5:
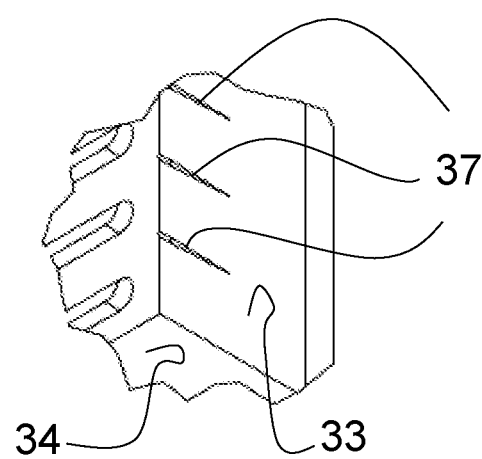
FIG. 5 is a broken-away, enlarged isometric illustration of a region of the drive carrier of the drive adapter of FIGS. 1 to 4.

In order to also fix the drive adapter on the first rail element 5 against a movement against the pull-out direction, the holding section 16 comprises two latching lugs 15 on the holding ridge 17. These latching lugs 15 are injection-moulded onto the rear side of the holding ridge, as can be seen in the plan view from above onto the drive adapter 3 of FIG. 3 and in the enlarged detail view of FIG. 4.

To ensure that the latching lugs 15 deflect relative to the rest of the holding ridge 17 when the holding section 16 is pushed in between the legs 7, 8 of the rail element 5, the two latching lugs 15 are disposed on webs 24, 25 of the holding ridge 17 and elongated openings are provided between the webs and the rest of the holding ridge 17.

Figure 6:
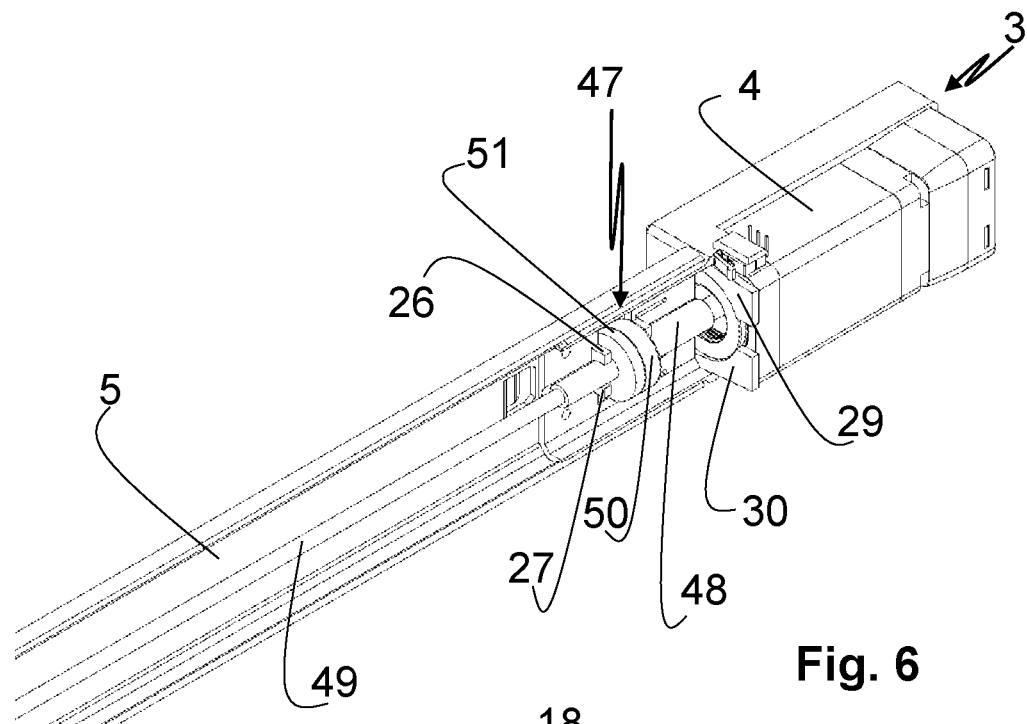
FIG. 6 is a broken-away isometric illustration of a system comprising the first rail element of a telescopic rail of FIG. 1, the drive adapter according to FIGS. 2 to 5 and a drive element having an electric motor.

FIG. 6 shows the first rail element 5 with the drive adapter 3 mounted on it and the elements of the actual drive received on the drive adapter 3 and the first rail element 5. An electric motor 4 is received on the drive carrier 18 of the drive adapter 3. This electric motor 4 drives a spindle drive as the output shaft 49 via a drive shaft 48 and a magnetic coupling 47.

In the shown embodiment of the drive adapter 3 according to FIGS. 2 to 6, but also in the embodiment according to FIGS. 7-10, the drive adapter 3 also serves to guide and mount the other elements of the drive which extend beyond the electric motor 4.

For this purpose, the holding ridge 17 of the holding section 16 carries two bearing blocks 26, 27. In this embodiment, each of the bearing blocks 26, 27 forms a part, namely the half-shell-shaped bearing bushing of a sliding bearing, for guiding the drive 48 and output shafts 49 of a drive train which are coupled via a magnetic coupling 47.

In the shown embodiment, the drive shaft 48 and the output shaft 49 are coupled to one another via the magnetic coupling 47 to a maximum torque. The magnetic coupling 47 comprises a first coupling element 50 and a second coupling element 51. The first coupling element 50 is the coupling element on the motor shaft side. This first coupling element 50 is connected to the motor shaft 48 in a torque-proof manner. In other words, a torque of the motor shaft 48 is introduced from the motor shaft 48 into the first coupling element 50 without slip and torque loss. The motor shaft 48 and the first coupling element 50 always rotate at the same angular velocity. The second coupling element 51 is in turn connected to the threaded spindle 49 in a torque-proof manner, so that a torque transmitted to the second coupling element 51 is transmitted to the threaded spindle 49 in full and without slip. The threaded spindle 49 and the second coupling element 51 always rotate at the same angular velocity.

The two coupling elements 50, 51 are connected to one another in an axial direction frictionlocking manner. The force which acts in axial direction and produces the friction fit is a magnetic force from a permanent magnet. In the shown embodiment, the first, motor-side coupling element 50 comprises the permanent magnet. This permanent magnet attracts the second, spindle drive-side coupling element 51. Therefore, the first coupling element 50 is also referred to as a pot magnet and the second coupling element 51 is referred to as a magnetic thrust ring.

The magnetic coupling 47 makes it possible to provide torque limitation and also facilitates mounting of the unit consisting of the drive adapter 3 and an electric motor 4 received on it. In one example, the spindle drive can be premounted on the first rail element 5, while the drive adapter 3 is then mounted on the first rail element 5.

The holding section 16 is adjoined by a drive carrier 18. In the embodiments of FIGS. 2 to 6, 7 to 10 and 11, the drive carrier 18 serves to receive an electric motor 4 as a drive element in the sense of the present application. The electric motor 4 is also mounted on the drive carrier 18 without tools.

In the embodiment of FIGS. 2 to 6, the electric motor is clamped on a substantially circular mounting section 31 by means of two clamping jaws 29, 30 which define a circular clamping region 28. The drive carrier further comprises a mounting frame 32 having four wall surfaces 33, 34, 35, 36. The front faces 37, 38 of the electric motor 44 are clamped by the two wall surfaces 33, 36 of the mounting frame 32 which are opposite to one another in pull-out direction. The distance between the two front faces 37, 38 of the electric motor 4 is slightly smaller than the clear distance between the two clamping surfaces 33, 36 of the mounting frame 32, whereby, however, crimping beads 37 are provided on the clamping surface 33. These project into the interior of the mounting frame 32 enclosed by the wall surfaces 33, 34, 35, 36, so that the crimping beads are pressed together by the front face 38 of the electric motor 4 when the electric motor 4 is inserted into the mounting frame 32 and the two clamping surfaces 33, 36 also clamp the electric motor 4 in a direction parallel to the pull-out direction 11. The crimping beads 37 can also be seen in the 5 enlarged illustration of FIG. 5.

In the embodiment of FIGS. 2 to 6, a mounting means 38 is additionally provided on the drive carrier 18 for clamping a microswitch as end position detection for the second rail element, which can move relative the first rail element 5.

Figure 7:
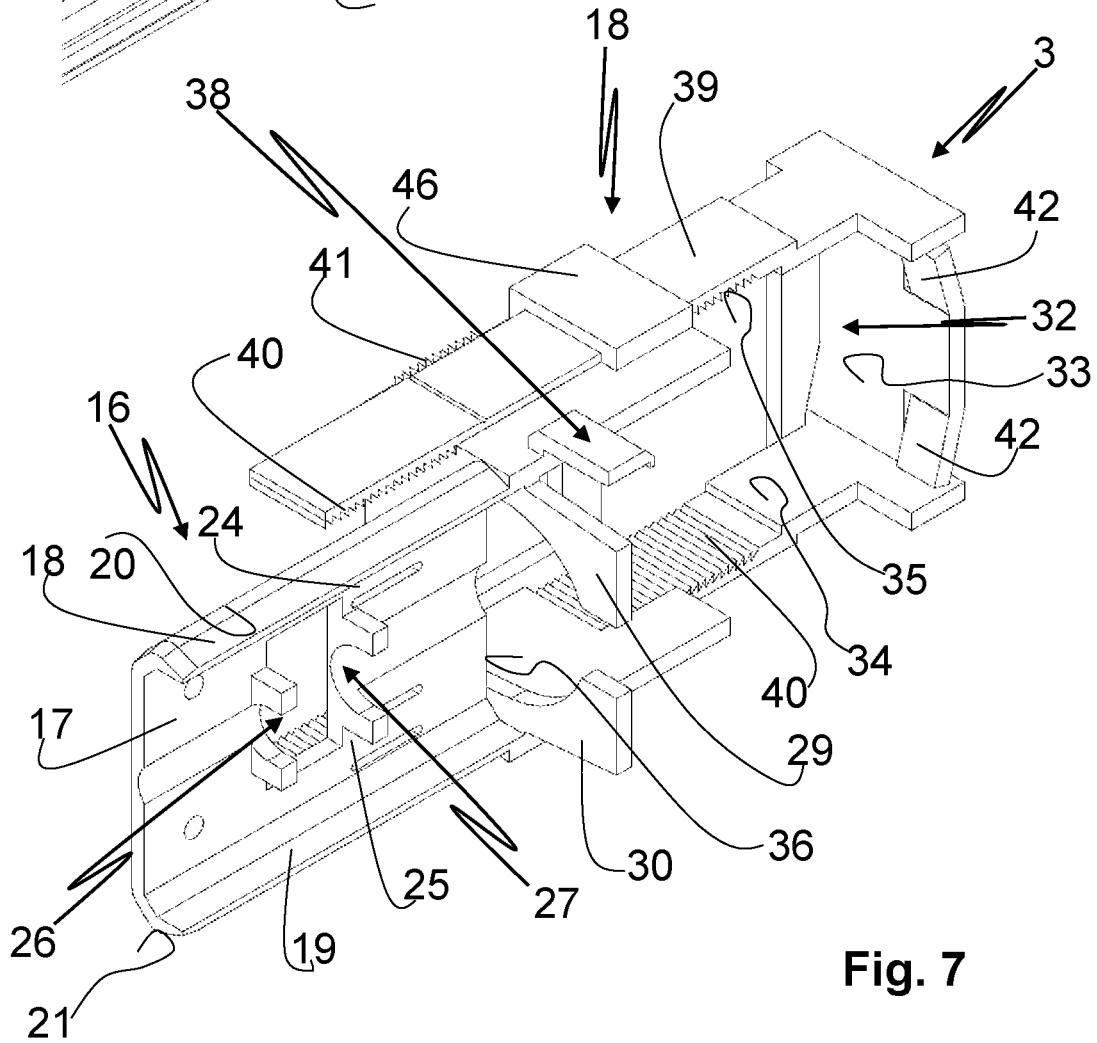
FIG. 7 is an isometric illustration of a second embodiment of a drive adapter from above at an angle.
Figure 8:
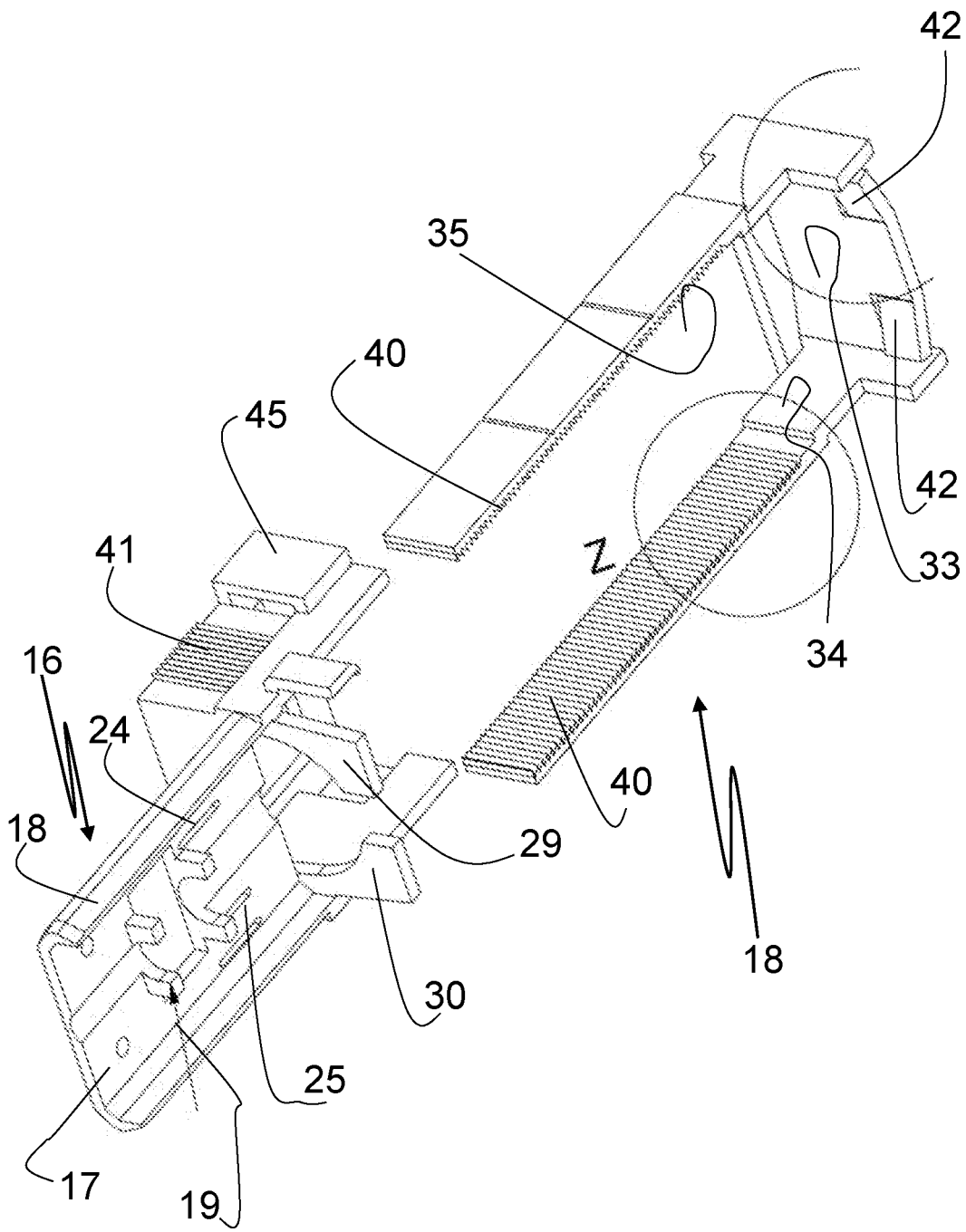
FIG. 8 is an isometric exploded view of the drive adapter of FIG. 7.
Figure 9:
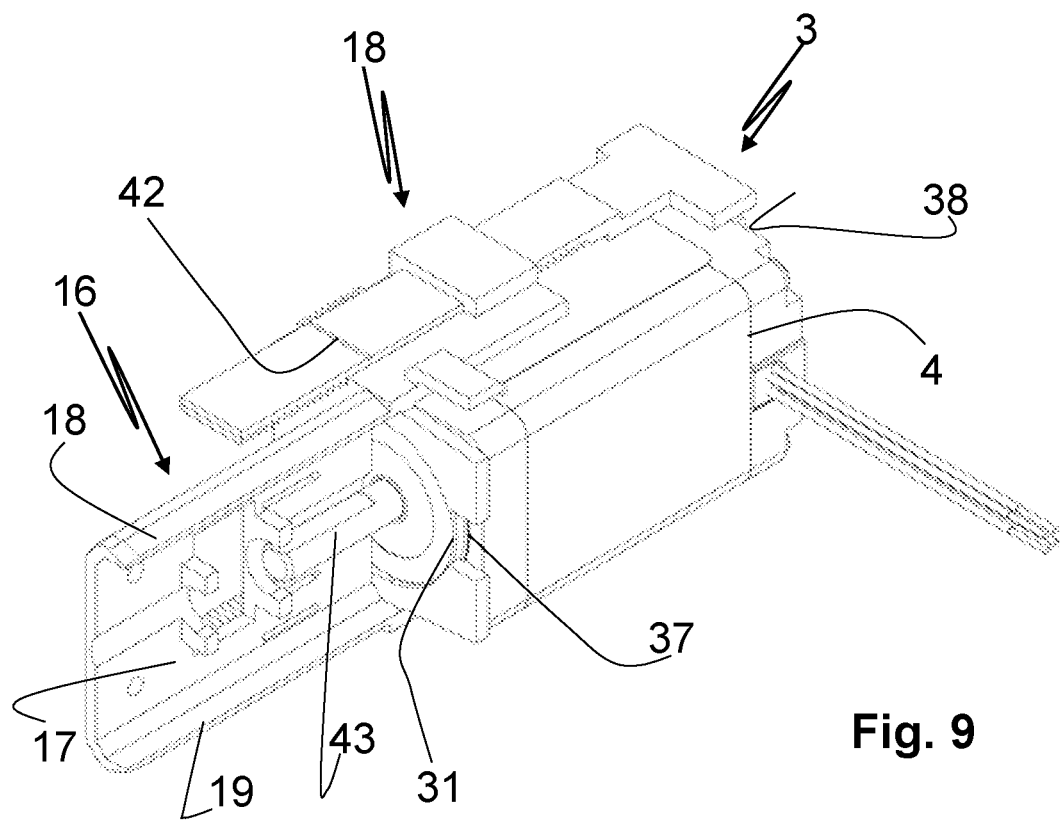
FIG. 9 is an isometric illustration of the drive adapter of FIGS. 7 and 8 with an electric motor received on it.

The embodiment of the drive adapter 3 according to FIGS. 7 to 9 differs from the first embodiment of the drive adapter 3 in that, in terms of its length in the direction of the pull-out direction 11, the mounting frame 32 is configured such that it is in two parts and is adjustable. To ensure the length adjustability, the side wall surfaces 34, 35 of the mounting frame 32 are respectively provided with 15 latching teeth 40.

The side walls of the mounting frame 32 are slid into receptacles 46 provided for this purpose, which are connected to the rest of the mounting frame 32 and also to the drive carrier 16. The latching teeth 40 mesh with complementary latching teeth 41 on the portion of the mounting frame 32 which is fixedly connected to the holding section 16. The latching teeth 40, 41 are configured to allow an insertion movement of the one element relative to the other element in pull-out direction, but not allow the one element to be pulled out of the other against the pull-out direction 11. An electric motor 4 received in the mounting frame 32 can thus be clamped after insertion by irreversibly pushing the one element into the other. The clamping surface 33 also comprises two resilient portions 42, which pretension the clamping surface 33 in sections in the direction of the electric motor 4 and clamp it.

Figure 10:
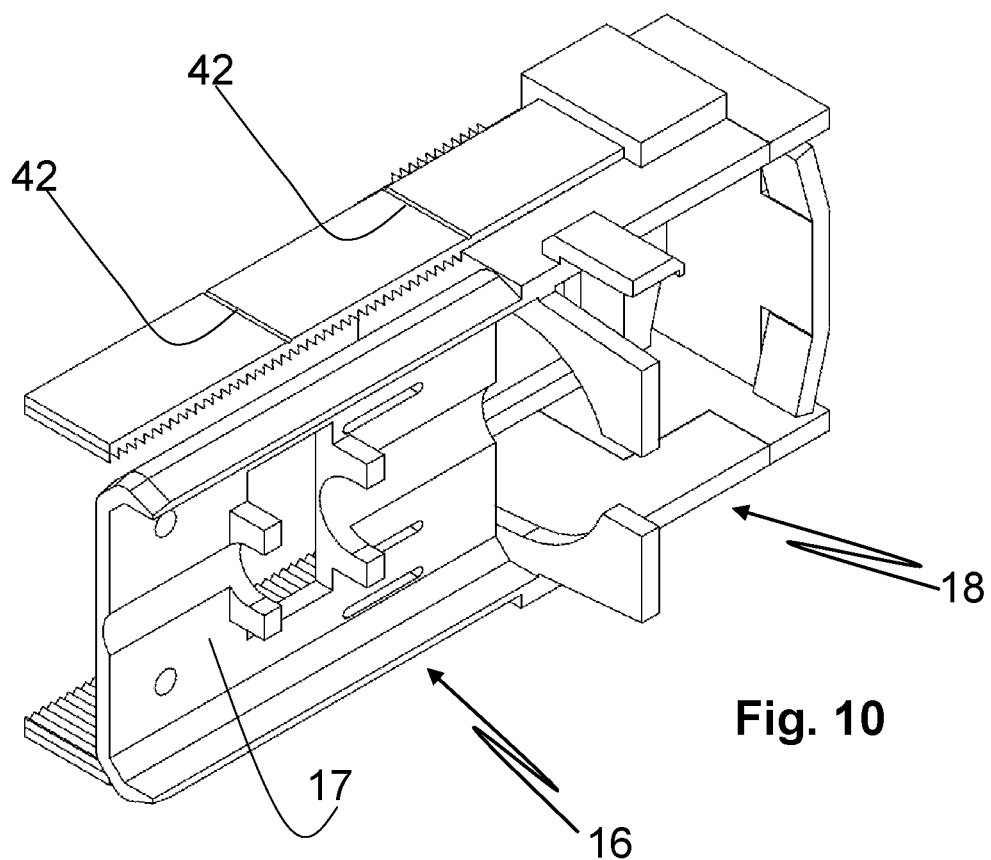
FIG. 10 is an isometric illustration of the drive adapter from FIGS. 7 to 9 from above at an angle in a second, shorter length of the drive carrier than shown in FIG. 7.

In addition to the simplified mounting of the electric motor 4, the embodiment of the drive adapter 3 of FIGS. 7 to 10 makes it possible to adapt the mounting frame in its longitudinal direction parallel to the pull-out direction 11 to different lengths of electric motors 4. This can be clearly seen by comparing the illustrations of FIGS. 7 and 10. Whereas the drive carrier or its mounting frame 32 in FIG. 7 is adapted to receive a long electric motor 4, the setting in FIG. 10 is such that a shorter electric motor can be clamped.

As can be clearly seen from FIG. 10, the wall portion of the mounting frame carrying the latching teeth 40 is provided with two predetermined breaking points 42, which make it possible to reduce the amount the mounting frame projects in pull-out direction 11 in the case of very short electric motors. The frame is then broken off to the extent that it projects.

Figure 11:
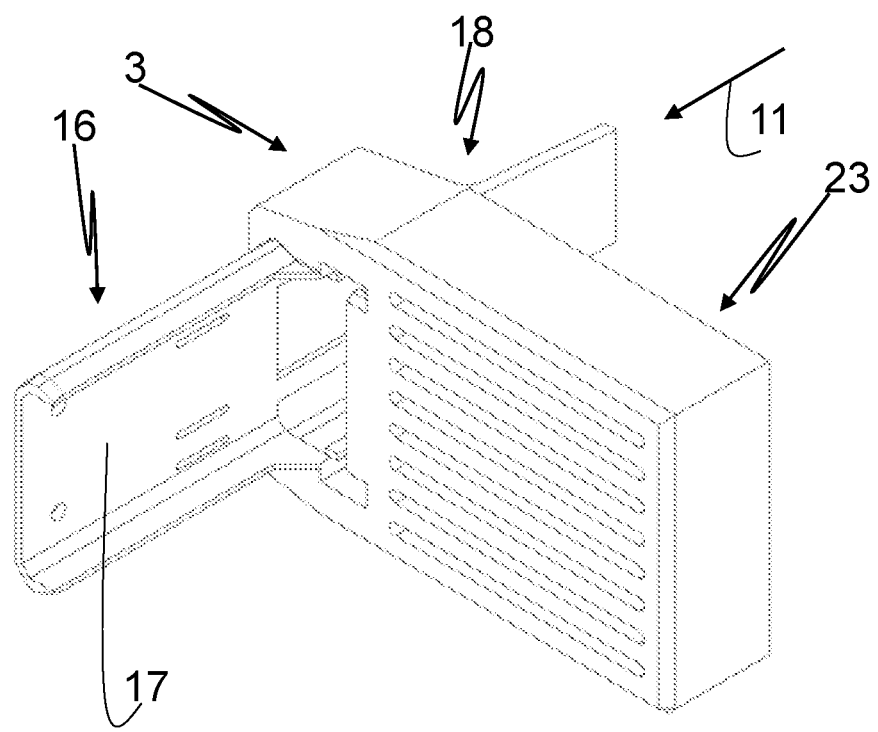
FIG. 11 is an isometric illustration of a third embodiment of the drive adapter from above at an angle.

In the embodiment of FIG. 11, the drive carrier 18 is disposed such that the motor shaft 43 of the electric motor 4 extends perpendicular to the pull-out direction 11 instead of parallel. The drive adapter 3 of this embodiment can thus be implemented to realise a belt drive in which the drive belt extends in pull-out direction and is driven by a spur gear on the motor shaft 43 of the electric motor 4. In this embodiment, the two clamping surfaces extend substantially parallel to the holding ridge 17 of the holding section 16.

Figure 12:
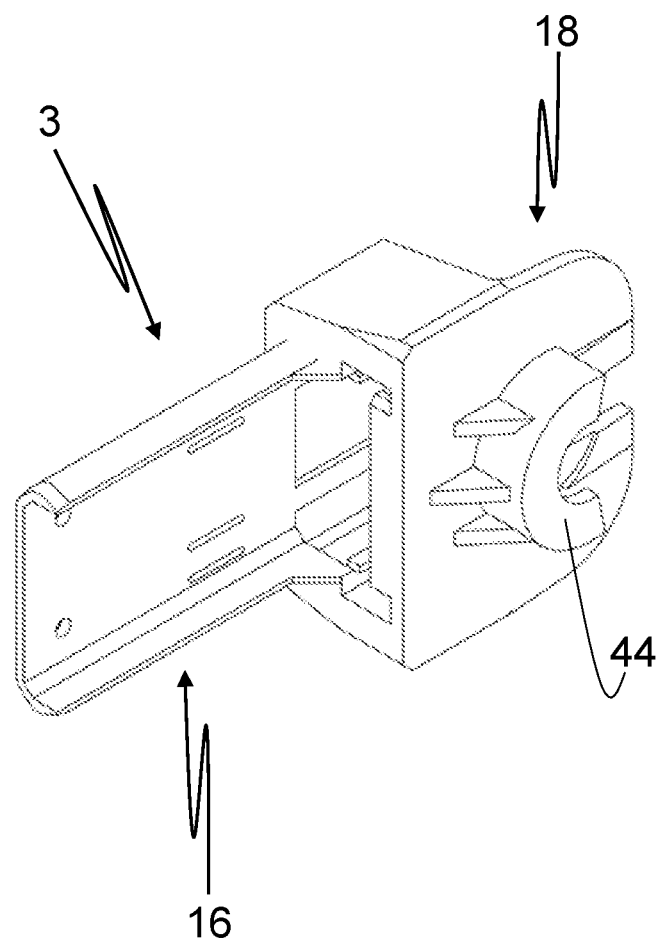
FIG. 12 is an isometric illustration of a further embodiment of a drive adapter from above at an angle.

Unlike in the embodiments according to FIGS. 2 to 11, in the embodiment of FIG. 12, the drive adapter 3 is not provided for receiving an electric motor 4 in the drive carrier 18. Instead, the drive carrier 18 comprises a bearing seat 44 for a rolling bearing of a drive rod or shaft for synchronising the motor drive of two telescopic rails. This rolling bearing likewise forms part of a drive element in the sense of the present application.

For the purpose of the original disclosure, it should be noted that all of the features as they become apparent to a person skilled in the art from the present description, the drawings and the claims, even if they have been specifically described only in connection with specific other features, can be combined both individually and in any combination with other features or groups of features disclosed here, insofar as this has not been expressly excluded or technical circumstances make such combinations impossible or pointless. A comprehensive, explicit presentation of all conceivable combinations of features is omitted here solely for the sake of brevity and legibility of the description.

Although the invention has been presented and described in detail in the drawings and the foregoing description, this representation and description is merely an example and is not intended to limit the scope of protection as defined by the claims. The invention is not limited to the disclosed embodiments.

Modifications of the disclosed embodiments will be obvious to those skilled in the art from the drawings, the description and the appended claims. In the claims, the word "comprise" does not exclude other elements or steps, and the indefinite article "a" does not exclude a plurality. The mere fact that certain features are claimed in different claims does not preclude their combination. Reference signs in the claims are not intended to limit the scope of protection.

LIST OF REFERENCE SIGNS

1 System
2 Telescopic rail
3 Drive adapter
4 Electric motor
5 First rail element
6 Rail back
7 Upper leg
8 Lower leg
9, 10 Rolling element running surfaces
11 Pull-out direction
12 Opening
13, 14 Latching recesses
15 Latching lug
16 Holding section
17 Holding ridge
18 Drive carrier
18, 19 Legs
20, 21 Support surface
22 Outer surface
23 Front face
24, 25 Webs
26, 27 Bearing block
28 Clamping region
29, 30 Clamping jaws
31 Mounting section
32 Mounting frame
33, 34, 35, 36 Wall surface
33, 36 Clamping surface
37, 38 Front face
37 Crimping bead
38 Mounting means
40, 41 Latching teeth
42 Predetermined breaking points
42 Resilient portion
43 Motor shaft
44 Bearing seat
45 End of the first rail element
46 Receptacle
47 Magnetic coupling
48 Drive shaft
49 Output shaft
50 First coupling element
51 Second coupling element

The invention claimed is:

1. A drive adapter for tool-free mounting of a drive element on a rail element of a guide system comprising:
   a drive carrier; and
   a holding section,
   wherein the drive carrier comprises:
      a mounting means for a drive element,
   wherein the holding section comprises:
      two support surfaces, and
      a holding ridge which connects the support surfaces at least in sections and defines a distance between the support surfaces,
   wherein the two support surfaces are:
      each convexly curved,
      face away from one another, and
      configured such that they can be clamped between two rolling element running surfaces of the rail element which face one another.

2. The drive adapter according to claim 1, wherein the holding section comprises at least one latching lug or a latching recess for latching with a complementary element on the rail element.

3. The drive adapter according to claim 1, wherein the drive adapter is made in one piece of plastic.

4. The drive adapter according to claim 1, wherein the holding ridge carries at least one bearing block for receiving a bearing of a shaft.

5. The drive adapter according to claim 1, wherein the mounting means of the drive carrier comprises two clamping jaws with concave clamping surfaces which face one another for clamping a convex outer surface of the drive element having an electric motor in a force-locking manner.

6. The drive adapter according to claim 1, wherein the mounting means of the drive carrier comprises a mounting frame having two opposite clamping surfaces for receiving the output element between the two clamping surfaces in a force-locking manner.

7. The drive adapter according to claim 6, wherein a distance between the two opposite clamping surfaces is adjustably variable so that drive elements of different lengths can be received in the mounting frame.

8. The drive adapter according to claim 6, wherein at least one of the two clamping surfaces is resiliently pretensioned at least in sections in the direction of the other clamping surface.

9. The drive adapter according to claim 6, wherein at least one of the two clamping surfaces comprises at least one crimping bead for clamping the drive element in a force-locking manner.

10. The drive adapter according to claim 6, wherein the two clamping surfaces extend substantially perpendicular or substantially parallel to the holding ridge.

11. A system comprising:
a guide system comprising at least a first and a second rail element;
a drive element; and
the drive adapter according to claim 1,
wherein the first rail element comprises:
two legs which each carry a concavely curved rolling element running surface, and
a rail back which connects said legs,
wherein the holding section is
clamped into the first rail element such that both of the convexly curved support surfaces which face away from one another are each in engagement with a rolling element running surface.

12. The system according to claim 11, wherein either a distance between the support surfaces of the holding section which face away from one another prior to being placed into the first rail element is larger than a distance between the rolling element running surfaces of the rail element or a distance between the support surfaces of the holding section which face one another prior to being placed onto the first rail element is smaller than a distance of the outer surfaces of the legs which face away from one another.

13. The system according to claim 11, wherein the holding ridge of the drive adapter comprises a latching lug that is snapped into a latching recess in the rail back of the first rail element or the rail back of the first rail element comprises a latching lug that is snapped into the holding ridge of the drive adapter.

14. A drive adapter for tool-free mounting of a drive element on a rail element of a guide system comprising:
a drive carrier; and
a holding section,
wherein the drive carrier comprises:
a mounting means for a drive element,
wherein the holding section comprises:
two support surfaces, and
a holding ridge which connects the support surfaces at least in sections and defines a distance between the support surfaces,
wherein the two support surfaces are either:
each convexly curved,
face away from one another, and
configured such that they can be clamped between two rolling element running surfaces of the rail element which face one another,
or
each concavely curved,
face toward one another, and
configured such that they can be clamped onto two legs of the rail element which carry rolling element running surfaces and face away from one another,
wherein the holding ridge carries two bearing blocks for receiving a respective bearing of a drive shaft and an output shaft, wherein an opening for receiving a coupling between a drive shaft and an output shaft is provided in the holding ridge between the two bearing blocks.

15. A system comprising:
a guide system comprising at least a first and a second rail element;
a drive element; and
the drive adapter according to claim 5,
wherein the first rail element comprises:
two legs which each carry a concavely curved rolling element running surface, and
a rail back which connects said legs,
wherein the holding section is either:
clamped into the first rail element such that both of the convexly curved support surfaces which face away from one another are each in engagement with a rolling element running surface,
or
clamped onto the first rail element such that the concavely curved support surfaces which face one another are in engagement with outer surfaces of the legs which face away from one another.

16. A drive adapter for tool-free mounting of a drive element on a rail element of a guide system comprising:
a drive carrier; and
a holding section,
wherein the drive carrier comprises:
a mounting means for a drive element,
wherein the holding section comprises:
two support surfaces, and
a holding ridge which connects the support surfaces at least in sections and defines a distance between the support surfaces,
wherein the two support surfaces are either:
each convexly curved,
face away from one another, and
configured such that they can be clamped between two rolling element running surfaces of the rail element which face one another,
or
each concavely curved,
face toward one another, and
configured such that they can be clamped onto two legs of the rail element which carry rolling element running surfaces and face away from one another,
wherein the mounting means of the drive carrier comprises a rolling bearing seat for receiving a rolling bearing of a shaft.

17. The drive adapter according to claim 16, wherein the rolling bearing seat is disposed to receive a rolling bearing for a shaft which is substantially perpendicular to the holding ridge.

18. A system comprising:
a guide system comprising at least a first and a second rail element;
a drive element; and
the drive adapter according to claim 12,
wherein the first rail element comprises:
two legs which each carry a concavely curved rolling element running surface, and
a rail back which connects said legs,
wherein the holding section is either:
clamped into the first rail element such that both of the convexly curved support surfaces which face away from one another are each in engagement with a rolling element running surface,
or
clamped onto the first rail element such that the concavely curved support surfaces which face one another are in engagement with outer surfaces of the legs which face away from one another.

* * * * *